United States Patent [19]

Soberalski et al.

[11] Patent Number: 4,706,919

[45] Date of Patent: Nov. 17, 1987

[54] KEYBOARD SUPPORT WITH AUTOMATIC LOWERING MECHANISM

[75] Inventors: Edward D. Soberalski, Belmont; Craig Miller, Georgetown Township, Kent County, both of Mich.

[73] Assignee: Haworth, Inc., Holland, Mich.

[21] Appl. No.: 943,521

[22] Filed: Dec. 17, 1986

[51] Int. Cl.$^4$ ................................................ A47F 5/00
[52] U.S. Cl. .................................. 248/281.1; 248/293
[58] Field of Search ..................... 248/281.1, 293, 279, 248/298, 276; 108/69, 75; 312/27, 28; 95/82; 350/85

[56] References Cited

U.S. PATENT DOCUMENTS

| | | |
|---|---|---|
| 851,659 | 6/1907 | Gaiikema . |
| 1,037,627 | 9/1912 | Hunter . |
| 1,122,372 | 12/1914 | Duncan . |
| 1,532,715 | 2/1925 | Petrarca . |
| 1,606,975 | 3/1926 | Tobey . |
| 2,524,386 | 10/1950 | Johnston . |
| 2,710,783 | 6/1955 | Chaft . |
| 4,616,798 | 10/1986 | Smeenge et al. . |
| 4,632,349 | 12/1986 | Anstey . |

OTHER PUBLICATIONS

Waterloo Metal Stampings Ltd. drawing, installation sheet and description of "Computer Keyboard Slide/Tilt Mechanism".

Primary Examiner—Robert W. Gibson, Jr.
Assistant Examiner—Sarah A. Lechok Eley
Attorney, Agent, or Firm—Flynn, Thiel, Boutell & Tanis

[57] ABSTRACT

An adjustable auxiliary work support assembly which includes a shelflike auxiliary support connected to one end of a parallelogram linkage. The other end of the linkage is connected to a carriage which is slidably supported within a guide rail fixed to the underside of a main support. The linkage enables the auxiliary support to be vertically swung upwardly and downwardly. A cam structure includes first and second cams respectively fixed to the rail and linkage, and a cam follower pivotally mounted on the carriage and cooperating between the cams to effect automatic lowering of the auxiliary support when the latter is closely adjacent the front edge of the main support and is pushed inwardly toward the latter. The cam structure also includes a pair of side cams fixed to the carriage in strattling relationship to the cam follower, and which cooperate with the fixed cam on the linkage to effect automatic lowering of the linkage when it is pivotally swung sidewardly beyond a permissible angular extent.

9 Claims, 9 Drawing Figures

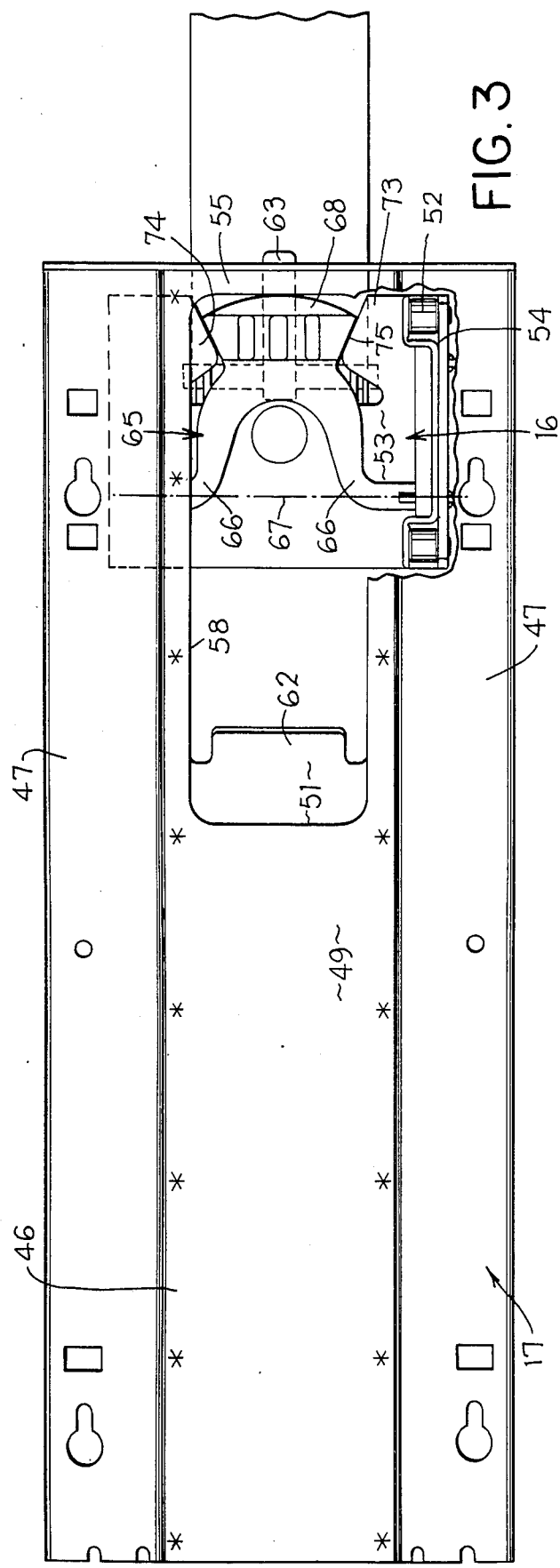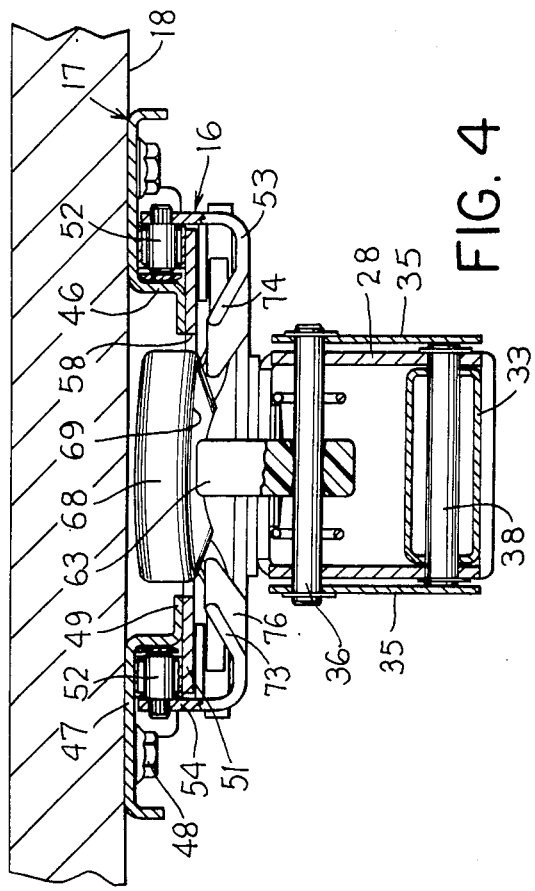

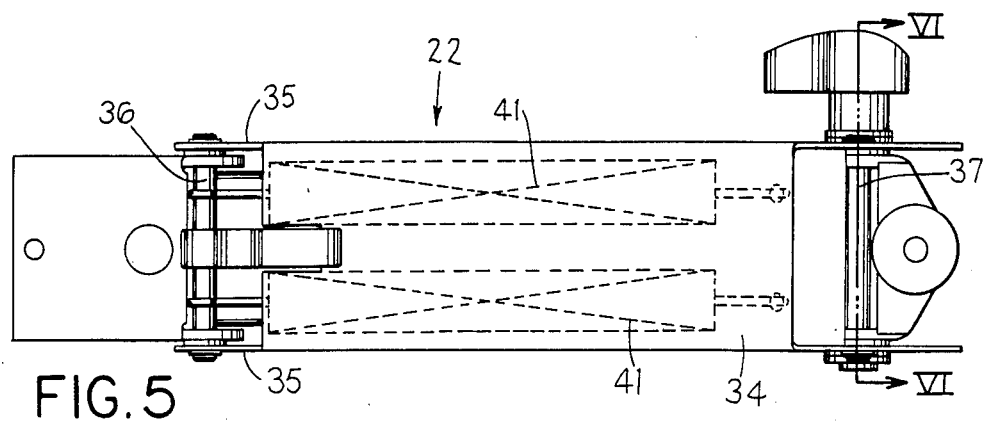
FIG. 5
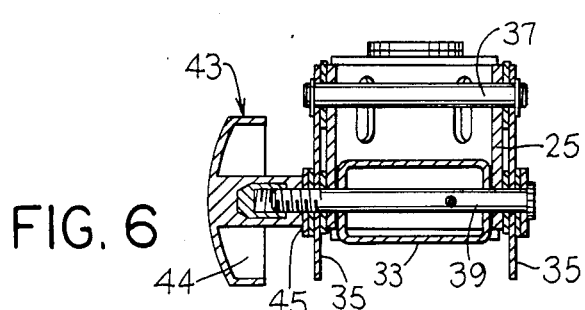
FIG. 6
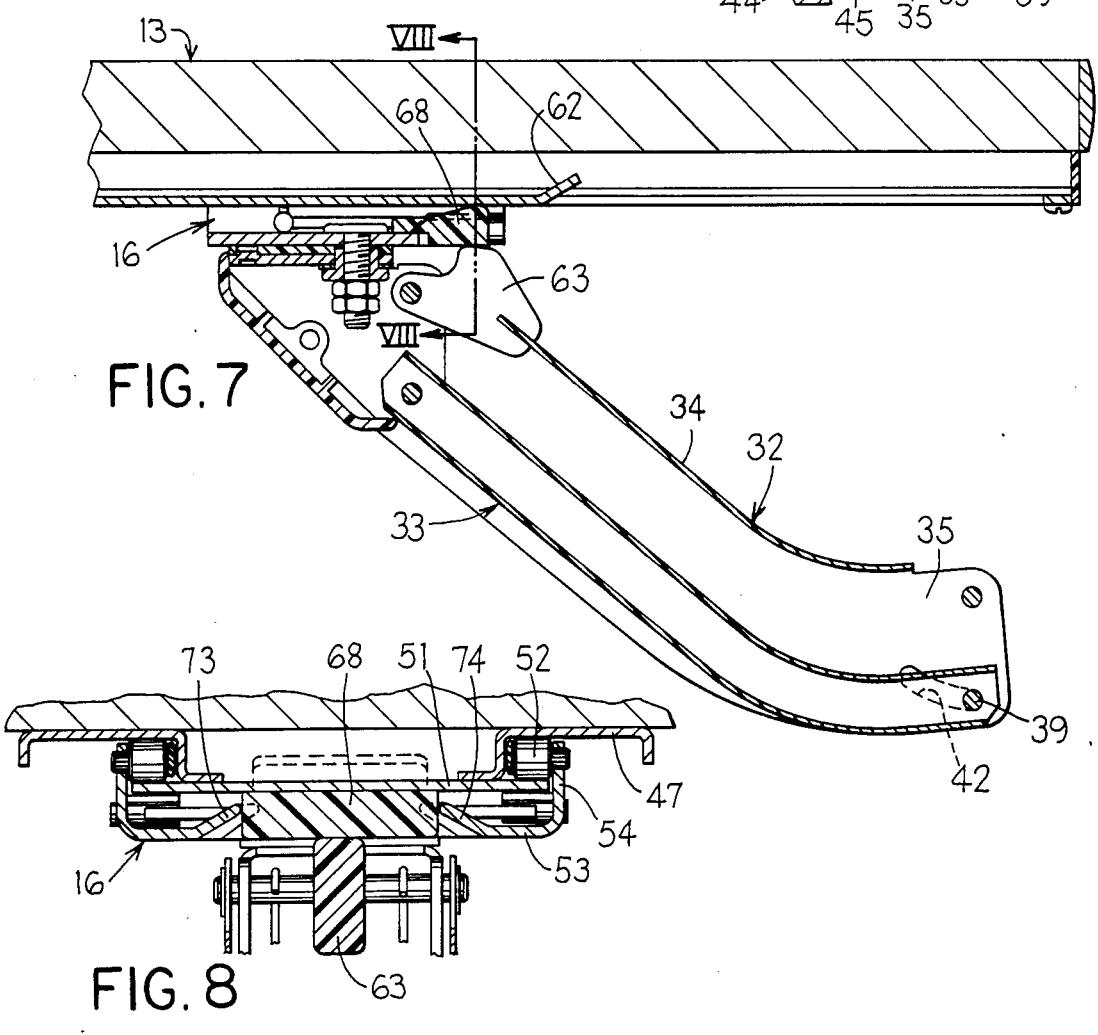
FIG. 7
FIG. 8

KEYBOARD SUPPORT WITH AUTOMATIC LOWERING MECHANISM

FIELD OF THE INVENTION

This invention relates to an improved auxiliary work support arrangement as for supporting a keyboard and, more specifically, to an improved support mechanism which causes automatic lowering of an auxiliary work support if it is moved inwardly or sidewardly relative to a main work support beyond a predetermined extent.

BACKGROUND OF THE INVENTION

U.S. Pat. No. 4,616,798, as owned by the assignee of this application, illustrates a support mechanism which interconnects an auxiliary work support to a main work support. The support mechanism enables the auxiliary work support and a keyboard thereon to be moved in-and-out, sidewardly, and up-and-down relative to the main work support. In addition, the auxiliary work support can be disposed in a lowermost position and then moved inwardly into a storage position beneath the main work support. The mechanism of the aforementioned patent has proven highly desirable and has met with significant commercial success in view of the extreme versatility and convenience which it provides. However, the improved support mechanism of this invention has been developed so as to provide even greater convenience of use and operator flexibility.

In the improved support mechanism of the present invention, a vertically swingable linkage is preferably connected at its inner end to a vertical pivot structure, the latter being carried by a carriage slidably supported on the underside of the main work support. A cam mechanism cooperates between the carriage and the vertically swingable linkage, which cam mechanism provides a three-dimensional cooperation so as to automatically swing the linkage and the auxiliary work support downwardly to a predetermined elevation when the auxiliary work support is moved either inwardly or sidewardly relative to the main work support beyond a predetermined position. The auxiliary work support and the keyboard thereon are hence automatically cammed downwardly to prevent the keyboard from being hit by the main work support and knocked off of the auxiliary work support.

In the improved arrangement of this invention, the cam and vertical pivot also provide increased capability in terms of accomplishing the above while permitting the overall height of the structure to be minimized, particularly in the vicinity of the carriage as mounted adjacent the underside of the main work support, and at the same time greatly facilitate the swinging of the linkage through a full 360° so that such swinging can be accomplished without encountering stops.

Other objects and purposes of the invention will be apparent to persons familiar with structures of this general type upon reading the following specification and inspecting the accompanying drawing.

BRIEF DESCRIPTION OF THE DRAWINGS

FIG. 3 is a top plan view of the track, and of the carriage mounted thereon, as shown disconnected from the main work support.

FIG. 4 is an enlarged fragmentary sectional view taken substantially along line IV—IV in FIG. 2.

FIG. 5 is a top plan view of the linkage and its interconnection to the hinge structures at opposite ends thereof.

FIG. 6 is a sectional view taken substantially along line VI—VI in FIG. 5.

FIG. 7 is a view like FIG. 2 but showing the support mechanism in a partially retracted and lowered position.

FIG. 8 is a fragmentary sectional view taken substantially along line VIII—VIII in FIG. 7.

Figure 1:
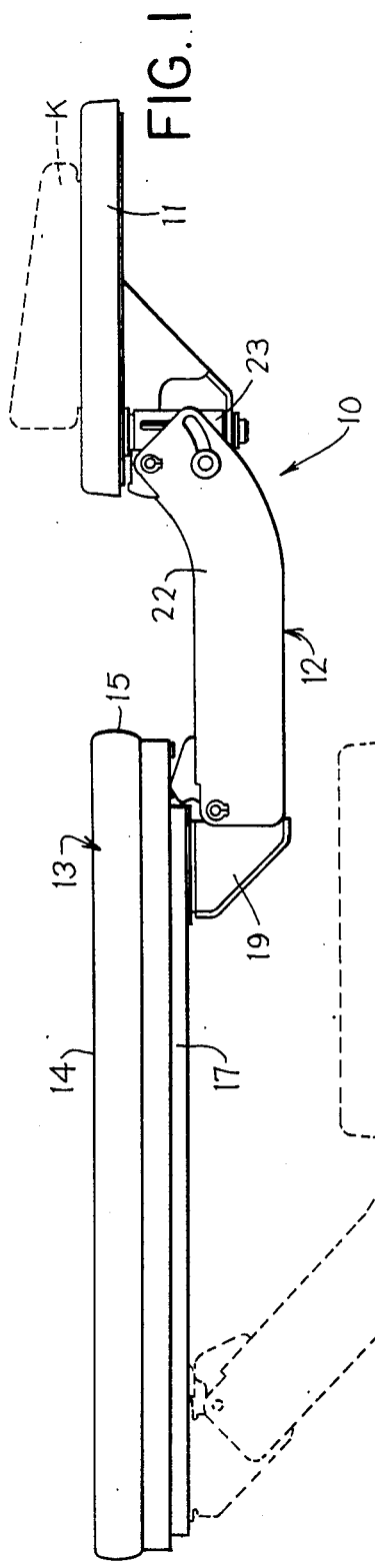
FIG. 1 a side elevatiohal view illustrating the support assembly mounted on a conventional primary work support, with the auxiliary work support being shown in solid lines in its use position and in dotted lines in its storage position.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also refer to the conventional upper surface of the work supports. The word "inwardly"0 will refer to movement of the auxiliary work support toward its storage position (leftwardly in FIGS. 1 and 2), and conversely "outwardly" will refer to movement away from the storage position (rightwardly in FIGS. 1 and 2). The words "inwardly" and "outwardly" will also refer to directions toward and away from, respectively, the geometric center of the assembly and designated parts thereof. Said terminology will include the words specifically mentioned, derivatives thereof, and words of similar import.

DETAILED DESCRIPTION

Figure 2:
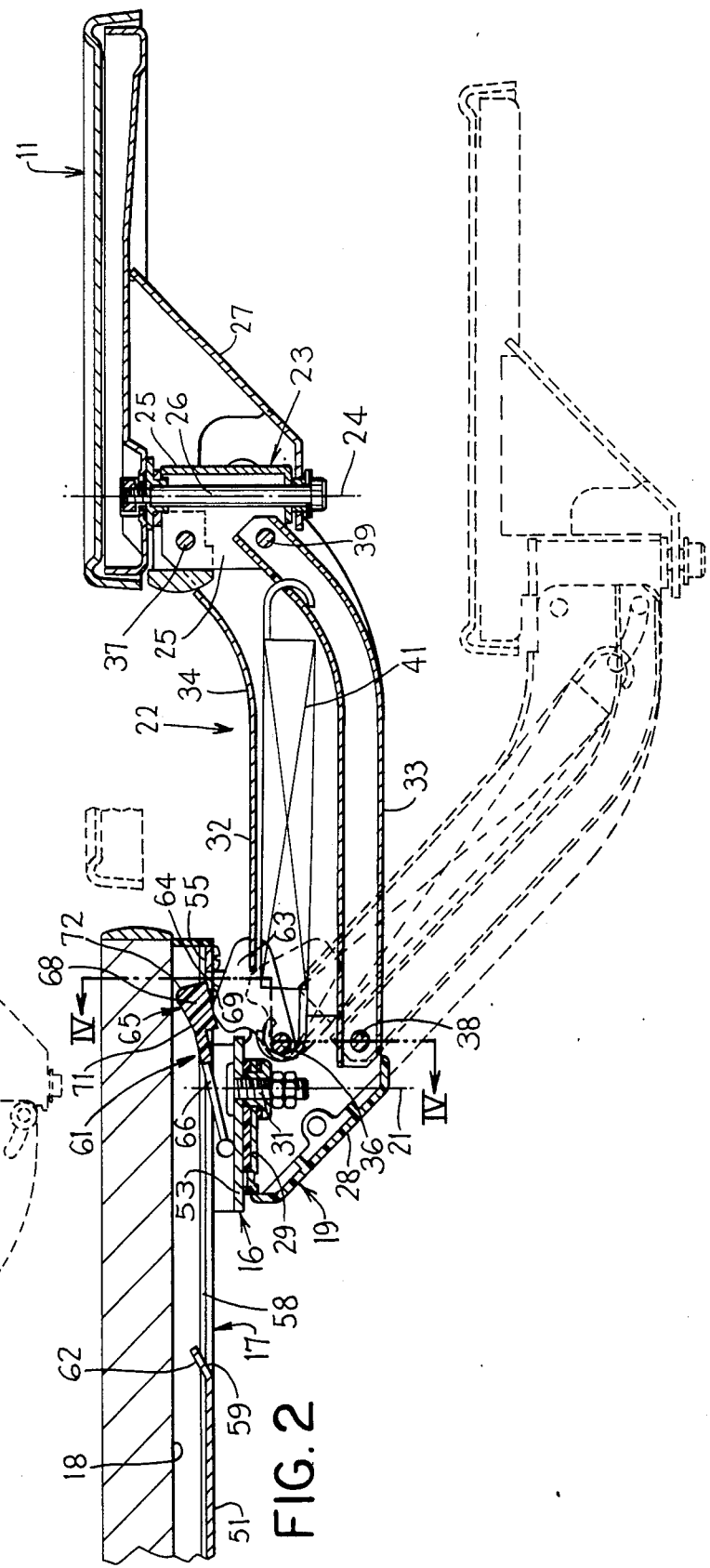
FIG. 2 is a sectional view similar to FIG. 1 but showing the auxiliary work support assembly on a somewhat enlarged scale.

Referring to FIGS. 1 and 2, there is illustrated an adjustable work support assembly 10 according to the present invention. This assembly includes a shelflike auxiliary support 11 which is sized to enable it to comfortably support thereon a keyboard K as conventionally associated with a computer. This keyboard support 11 is interconnected by a support mechanism 12 to a conventional stationary main support 13, the latter conventionally comprises the top of a table, desk or similar work surface structure. This support 13 defines thereon a standard upper surface 14 and a front edge 15.

The support mechanism 12 includes a carriage 16 which is slidably supported for substantially horizontal linear displacement relative to the main support 13. For this purpose, the carriage 16 is slidably and movably supported by an elongated track or guide rail structure 17 which is fixedly secured to the undersurface 18 of the support 13 and extends perpendicularly away from the front edge 15 thereof. Carriage 16 mounts thereunder a first vertical hinge structure 19 which defines a first vertical pivot axis 21. The inner or rearward end of a vertically-swingable link means 22 is hingedly connected to the first vertical hinge structure 19, and the outer or forward end of this link means 22 is similarly hingedly connected to a second vertical hinge structure 23, the latter being disposed directly under and hingedly interconnected to the auxiliary support 11 about a second vertical hinge axis 24.

This second vertical hinge structure 23 comprises a bracket member 25 which is pivotally supported on a vertical hinge pin 26 which has the upper end thereof secured to the auxiliary support 11 so as to project downwardly therefrom, the lower end of pin 26 being supported by a brace 27 which is secured to the underside of the auxiliary support 11.

The first vertical hinge structure 19 similarly comprises a bracket member 28 having a substantially horizontally extending top wall 29 disposed so as to be positioned directly under the carriage 16, a suitable bearing pad or plate 30 being disposed therebetween. A vertical hinge pin 31 is secured to the carriage and projects downwardly in a cantilevered fashion, and the bracket member 28 is rotatably supported on the lower end of this hinge pin 31 so that the bracket member 28 can hence pivot about the axis 21. This relationship enables the bracket member 28 to hence swing horizontally about the vertical axis 21 throughout a full 360° revolution, or several such revolutions, in either direction, without encountering any stops.

The link means 22 is a parallelogram linkage which includes elongated upper and lower links 32 and 33 respectively. The upper link 32 is of a generally downwardly opening U-shaped or channel-shaped configuration and includes a top wall 34 extending between a pair of substantially parallel and downwardly projecting side walls or legs 35. The lower link 33 is disposed so as to be preferably positioned substantially within this upper link 32 and, in the illustrated embodiment, this lower link 33 is of a shallow tubular cross section so as to extend substantially between the side legs 35. The upper link 32 has the opposite ends thereof horizontally hingedly joined to the first and second hinge structures 19 and 23 by means of horizontal hinge pins 36 and 37 respectively. Similarly, the opposite ends of the lower link 33 are hingedly connected to the first and second hinge structures 19 and 23 by further horizontal hinge pins 38 and 39, respectively. These latter hinge pins 38 and 39 are positioned generally vertically downwardly from the respective hinge pins 36 and 37 so that the links 32 and 33 hence define a parallelogram linkage which is swingable generally within a vertical plane.

The link means 22 is biased to swing upwardly into an uppermost position wherein the auxiliary support 11 is generally horizontally coplanar with the main support 13, substantially as illustrated by FIG. 2. For this purpose, biasing means in the form of springs 41 exert a biasing force on the link means 22 tending to swing it upwardly (counterclockwise) about the horizontal hinge pins 36 and 38. In the illustrated embodiment, a pair of coil-type tension springs 41 are disposed within the upper link 32 and have the outer ends thereof anchored to the lower link 33 in the vicinity of the hinge pin 39. The inner ends of these springs 41 have their ends anchored adjacent the inner end of the link means 22, specifically by being anchored about the upper horizontal hinge pin 36.

The side legs 35 of upper link 32 have arcuate slots 42 formed therein, and the opposite ends of the outer lower hinge pin 39 pass therethrough so as to accommodate the swinging movement of the link means 22. This lower outer hinge pin 39 has a friction lock or brake structure 43 associated therewith and formed by a manually-engageable knob 44 which is threaded onto the outer end of the pin 39 and which reacts against a friction washer 45 positioned between the knob and the outer surface of the side leg 35. Tightening of knob 44 against the friction washer 45 permits the link means 22 to be selectively locked at any intermediate position so that the operator can hence select the desired elevation of the auxiliary support 11.

The ends of the slots 42 abut the pin 39 and act as stops for limiting the upward swinging of the link means 22.

Considering now the carriage 16 and associated guide rail or track 17, the latter includes a horizontally elongated shallow channel member 46 having a pair of spaced side plates 47 which overlie the undersurface 18 and are fixed thereto, as by screws 48. These side plates 47 are joined by a shallow central channel having a base wall or bight 49 which is parallel with but spaced downwardly from the underside 18 by a small distance. This bight 49 has a horizontally extending bottom plate 51 secured thereto, the latter projecting sidewardly beyond the central channel portion so as to cooperate with the side plates 47 and hence define a pair of shallow sidewardly-opening channels for accommodating therein support rollers 52, the latter being mounted on opposite sides of the carriage 16.

The carriage 16 is of a shallow upwardly-opening channel configuration having a central support plate 53 which extends generally horizontally and is spaced slightly downwardly from the bottom plate 52. The center plate 53 has upwardly projecting side flanges 54 which mount the rollers 52 thereon. This center plate 53 mounts thereon the downwardly projecting hinge pin 31 so that the vertical hinge structure 19 is hence disposed directly below the carriage.

The front or outer end of the guide rail 17 defines a fixed transversely-extending stop 55 disposed for engagement with the front of the carriage 16 to limit the outward or forward extension of the support mechanism, substantially as illustrated by FIG. 2.

To control the elevation of the auxiliary support 11 relative to the main support 13 and ensure that the auxiliary support 11 is in the lowered position illustrated by dotted lines in FIG. 1, such as when the support 11 is moving inwardly so as to be disposed at least partially under the main support 13, the present invention provides a cam structure 61 which cooperates between the supports 11 and 13. More specifically, this cam structure 61 includes cams which are fixedly mounted on the track 17 and link means 22, together with an intermediate movable cam mounted on the carriage 16, and additional side cams which are fixedly mounted on the carriage 16, all as explained below.

As illustrated by FIG. 2, the cam structure 61 includes a first cam 62 which is formed substantially as a forwardly and upwardly inclined ramp as defined on the forward end of the bottom plate 51 of the track 17. This cam 62 terminates in a free edge at its forward end, whereby the cam 62 hence defines on the undersurface thereof a camming surface 59 which slopes downwardly as it projects rearwardly. The region of the track base wall 49 which is disposed forwardly of this cam 62 is cut away so as to define an elongate opening 58 which projects forwardly of the track so as to terminate substantially at the front stop 55.

The cam structure 61 includes a further cam 63 which is fixed to the upper link 32 of the link means 22. This cam 63 projects upwardly from the top wall 34 in the vicinity of the rear upper hinge pin 36 and defines an upper outer cam surface 64 which is within a first vertical plane and which extends substantially perpendicularly with respect to the hinge pin 36. This cam surface 64, within a second vertical plane which is perpendicular to said first vertical plane, is convexly rounded to facilitate its engagement with the side cams described hereinafter.

Cam structure 61 also includes a cam follower 65 which is mounted on the carriage 16 for movement therewith, and which is adapted to cammingly cooperate between the cams 62 and 63. This cam follower 65, when viewed from above, has a generally U-shaped configuration which includes a pair of side legs 66 which at their rearward ends terminate in horizontally and sidewardly projecting pintles which are pivotally supported on the carriage 16 so that the cam follower 65 is hence supported for swinging or pivotal movement about a horizontal pivot axis 67 which extends perpendicularly with respect to the direction of carriage movement. These side legs 66 at their forward ends are joined by a transversely extending bight 68 which is in effect an enlarged cam part which is of generally arcuate configuration. This cam part 68 is generated generally about a vertical axis which is disposed in the central vertical plane close to the pivot axis 67 so that the arcuate cam part 68 extends on opposite sides of the central vertical plane through an angle of about 35°, and hence the cam part 68 itself extends through a total angle of about 70°. The cam part 68 has a substantially flat or planar bottom surface 69 thereon which is adapted to slidably bear against the cam surface 64 of the cam 63. Cam part 68 also has a further cam surface 71 defined on the upper surface thereof, the latter being sloped rearwardly so as to converge relative to the bottom surface 69 as these surfaces project rearwardly toward the hinge axis 67. This upper cam surface 71 terminates in a rounded nose or surface 72 adjacent the radially outer edge of the cam part 68.

With the cooperation between the cams 62 and 63 and the intermediate movable cam follower 65, the cam follower 65 will normally be swung upwardly through the opening 58 in the track when the auxiliary support 11 is in its raised or partially raised position due to the engagement of the cam 63 with the underside of the cam part 68. This relationship is illustrated by FIG. 2. When the auxiliary support is moved inwardly toward the main support 13 substantially as indicated by the fragmentary dotted line position of FIG. 2, the cam part 68 hence initially contacts the cam ramp 62 so that further inward movement of the auxiliary support 11 causes the cam part 68 to be cammed downwardly about the axis 67, and the cam part 68 in turn bears against the cam 63 so that the link means 22 is hence rapidly swung downwardly in response to additional inward movement of the carriage 16. Hence, from the initial contact between the cam 62 and the follower 65, the auxiliary support 11 is swung downwardly from its uppermost position to its lowermost position, thus ensuring that the keyboard on the auxiliary support will not contact the front edge of the main support 13. Further, this downward swinging of the auxiliary support 11 from its upper to its lower position occurs while the carriage 16 moves inwardly through only a relatively small extent, such as in the neighborhood of about one and one-half inches. After passing over the cam ramp 62, the rounded nose 72 of the cam part 68 hence bears against the underside of the bottom plate 51 and holds the auxiliary support in its lowermost position while permitting the carriage 16 and the auxiliary support 11 to be slid rearwardly so as to be stored in a position located wholly beneath the main support 13.

Figure 9:
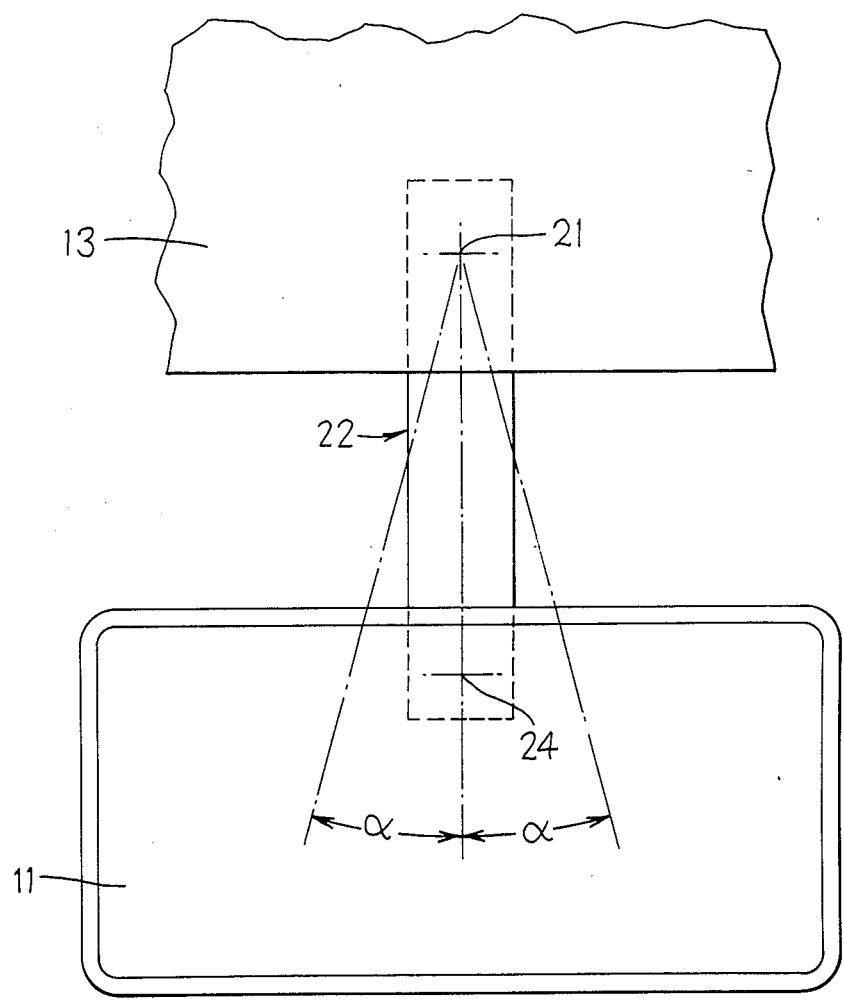
FIG. 9 is a fragmentary plan view.

Due to the angular extent of the cam part 68, the link means 22 and the cam 63 fixed thereto can be horizontally displaced about the vertical pivot axis 21 through a substantial angular extent from either side of a position wherein the longitudinal center line of the link means 22 projects perpendicularly outwardly from the front edge of the main support. For example, the link means 22 can be sidewardly swung into an angular position α of up to about 35° from either side of the central position substantially as illustrated by FIG. 9. Even when in this angular position, however, the cam surface 64 of the cam 63 still bears against the bottom surface 69 of the cam part 68 due to the angular extent of the latter, and hence the auxiliary support 11 will be effectively cammed downwardly due to the cooperation of the cams 62-63 and follower 65 as explained above.

In the event that the auxiliary support 11 is swung about the inner pivot axis 21 through an angle which exceeds the permissible angle α, then the cam structure 61 includes a pair of side cams 73 and 74 which are provided on the carriage 16 and cooperate with the cam 63. As illustrated by FIGS. 3 and 4, the central plate 53 defining the carriage 16 has the central front portion thereof removed so as to permit the cam follower 65 to swingably move downwardly for cooperation with the cam 63. On opposite sides of the cam part 68, however, the carriage 16 defines thereon the opposed pair of side cams 73 and 74. These side cams 73 and 74 are identical except for being mirror images of one another relative to the central vertical plane passing longitudinally of the carriage. That is, the cams 73 and 74 project inwardly toward one another so as to be disposed in straddling relationship closely adjacent the opposite ends of the arcuate cam part 68. In fact, these cams 73 and 74 define an opening therebetween which flares or widens as it projects outwardly so as to substantially correspond with the flared or widened configuration of the cam part 68. Each of these cams 73 and 74 is formed substantially as a ramp cam which is integrally joined to the substantially horizontally-extending central plate 53, with the specific cam 73 or 74 being sloped upwardly as it projects toward its free end, which free end is disposed closely adjacent one of the radially extending edge surfaces 75 of the cam part 68. The free edges of the cam ramps 73 and 74 are disposed at a raised elevation which substantially correspond to the uppermost elevation of the highest point of the cam surface 64 when the auxiliary support 11 is in its uppermost raised position as illustrated by FIG. 2.

With the provision of the side cams 73 and 74, if the link 22 and the auxiliary support 11 are swung sidewardly through an angle which exceeds the permissible angle α, then the surface 64 of the cam 63 moves sidewardly out of engagement with the undersurface 69 of the cam follower 65, and instead moves into engagement with the bottom camming surface 76 of the respective side cam 73 or 74 (such as the cam 73 for example). Hence, if the operator continues to sidewardly swingably displace the link means 22, then continued sideward displacement causes the cam 63 to be moved sidewardly and hence cammed downwardly along the cam 73, and this in turn causes automatic and rapid lowering of the auxiliary support 11 so as to prevent the keyboard from contacting the main support 13. This lowering occurs over a very small angular extent since, after the cam 63 is cammed downwardly throughout the short arcuate extent of the cam ramp 73, the cam 63 thereafter remains in engagement with the lower surface of the central carriage plate 53 and hence this retains the auxiliary support 11 in a lowered position.

Since the operation of the present invention has been explained above in conjunction with the detailed description of the structure, the operation thereof is hence believed self evident so that further detailed explanation thereof is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. In combination, a primary work support having an enlarged substantially planar upper surface and a front edge, an auxiliary shelflike support having a substantially planar upper surface adapted for supporting a keyboard thereon, and a support mechanism connecting the primary and auxiliary supports together for permitting the auxiliary support to be selectively vertically positioned in spaced relationship outwardly from the front edge and for additionally permitting the auxiliary support to be moved into a storage position beneath the primary support, said support mechanism including an elongated guide track fixed to the underside of said primary support and extending in generally perpendicular relationship to said front edge, a carriage means supported on said guide track for substantially linear back-and-forth movement adjacent and beneath said primary support in a direction which is substantially perpendicular to said front edge, and vertically swingable link means having the opposite ends thereof pivotally interconnected to the primary and auxiliary supports for permitting the latter to be selectively vertically displaced relative to the primary support, the improvement comprising cam means coacting between said track and said link means for causing the link means to automatically swing downwardly into a lowered position when the auxiliary support is positioned closely adjacent the front edge of said main support and is being pushed inwardly toward the latter, said cam means causing downward swinging of said link means only when the auxiliary support is disposed horizontally closely adjacent said front edge and is being pushed inwardly theretoward so that the link means is hence automatically swung downwardly as the carriage means is pushed rearwardly through only a small extent so that the auxiliary support will pass freely under the primary support.

2. A combination according to claim 1, wherein said cam means includes a first cam stationarily fixed to said track, a second cam stationarily fixed relative to said link means, and a cam follower movably supported on said carriage means and disposed for direct engagement between said first and second cams to effect downward swinging of the link means.

3. A combination according to claim 2, wherein said first cam is fixed to said track at a location which is spaced a substantial distance rearwardly from said front edge, wherein said second cam is mounted on said link means at a location closely adjacent the end thereof which is pivotally supported on said carriage means, and wherein said cam follower is swingably supported on said carriage means for movement about a horizontal pivot axis which extends transversely with respect to said direction, said cam follower having first and second cam surfaces defined on opposite sides thereof and respectively disposed for camming engagement with said first and second cams.

4. A combination according to claim 3, including vertical pivot means connected between said carriage means and the inner end of said link means for permitting the link means to be horizontally pivoted through a selected angle on opposite sides of a vertical plane which contains said direction, and said cam follower having an arcuate cam part which extends horizontally through at least said angle on opposite sides of said vertical plane so as to remain in engagement with said second cam so long as said link means is positioned within the arcuate extent defined by said selected angle.

5. A combination according to claim 4, including secondary cam means cooperating with said second cam for effecting automatic lowering of said link means if said link means is horizontally pivoted beyond said selected angle, said secondary cam means including third and fourth cams which are fixed to said carriage means adjacent opposite sides of said cam follower, said second cam being moved into direct camming engagement with one of said third and fourth cams when said link means is horizontally swung in excess of said selected angle.

6. A combination according to claim 1, including vertical pivot means mounted on said carriage means and defining a substantially vertical pivot axis, said link means having an inner end thereof horizontally pivotally mounted on said vertical pivot means, said vertical pivot means permitting said link means to be horizontally pivotally displaced about said vertical pivot axis through a selected angle in either direction away from a vertical plane which contains said vertical pivot axis and perpendicularly intersects said front edge, and secondary cam means coacting between said link means and said carriage means for automatically effecting downward swinging of said link means toward said lowered position whenever said link means is horizontally swung through an angle in access of said selected angle.

7. A combination according to claim 6, wherein said secondary cam means includes a pair of substantially identical cams which are fixedly mounted on said carriage means in sidewardly spaced relationship, and a further cam mounted on said link means and positioned so as to engage a selected one of the carriage cams only when the link means is swung through an angle which exceeds said selected angle.

8. A combination according to claim 6, wherein said first-mentioned cam means includes a first cam which is fixed to said track at a location spaced rearwardly from said front edge and a second cam which is mounted on said link means adjacent the inner end thereof, and said secondary cam means including substantially identical third and fourth cams which are fixed to said carriage means in sidewardly spaced relationship thereto, one of said third and fourth cams being cammingly engaged by said second cam only when said link means is horizontally swung through an angle in excess of said selected angle.

9. A combination according to claim 8, wherein said first-mentioned cam means includes a cam follower movably supported on said carriage means and disposed to coact directly between said first and second cams when the link means is swingably cammed downwardly, said cam follower being supported for vertical displacement relative to the carriage means and positioned generally between the third and fourth cams.

* * * * *